United States Patent
Lee et al.

(10) Patent No.: US 10,304,396 B2
(45) Date of Patent: May 28, 2019

(54) IMAGE PROCESSING METHOD FOR ALLEVIATING TAILING PHENOMENON AND RELATED IMAGING PROCESSING CIRCUIT AND DISPLAY APPARATUS

(71) Applicant: Himax Display, Inc., Tainan (TW)

(72) Inventors: Kuo-Jung Lee, Tainan (TW); Mao-Jung Chung, Tainan (TW); Yuet Wing Li, Tainan (TW); Wen-Hsu Chen, Tainan (TW)

(73) Assignee: Himax Display, Inc., Tainan (TW)

( * ) Notice: Subject to any disclaimer, the term of this patent is extended or adjusted under 35 U.S.C. 154(b) by 56 days.

(21) Appl. No.: 15/630,969

(22) Filed: Jun. 23, 2017

(65) Prior Publication Data

US 2018/0122317 A1    May 3, 2018

Related U.S. Application Data

(60) Provisional application No. 62/413,997, filed on Oct. 28, 2016.

(51) Int. Cl.
    *G09G 3/36* (2006.01)
    *G09G 3/34* (2006.01)
    *G09G 3/20* (2006.01)
    *G02F 1/1335* (2006.01)
    *G06F 3/147* (2006.01)

(52) U.S. Cl.
    CPC ......... *G09G 3/3614* (2013.01); *G09G 3/2092* (2013.01); *G09G 3/3413* (2013.01); *G09G 3/3611* (2013.01); *G02F 2001/133622* (2013.01); *G06F 3/147* (2013.01); *G09G 2310/0235* (2013.01); *G09G 2320/10* (2013.01); *G09G 2320/103* (2013.01)

(58) Field of Classification Search
    None
    See application file for complete search history.

(56) References Cited

U.S. PATENT DOCUMENTS

| | | | |
|---|---|---|---|
| 2005/0035977 A1 | 2/2005 | Yokoyama | |
| 2010/0259652 A1* | 10/2010 | Miura | H04N 5/23212 348/252 |
| 2011/0242129 A1 | 10/2011 | Zhou | |
| 2014/0253614 A1* | 9/2014 | Hudson | G09G 3/002 345/698 |
| 2015/0287368 A1* | 10/2015 | Ninan | G09G 3/32 345/690 |

FOREIGN PATENT DOCUMENTS

| | | |
|---|---|---|
| TW | 200615817 | 5/2006 |
| TW | 200923889 | 6/2009 |

* cited by examiner

*Primary Examiner* — Joseph R Haley
*Assistant Examiner* — Emily J Frank
(74) *Attorney, Agent, or Firm* — Winston Hsu

(57) ABSTRACT

An image processing method includes detecting one or more edge regions in a plurality of input image frames; detecting movement of the edge region in the input image frames to generate a movement detecting result; and generating a plurality of output image frames by selectively smoothing at least a portion of the edge region at least according to the movement detecting result.

17 Claims, 7 Drawing Sheets

IMAGE PROCESSING METHOD FOR ALLEVIATING TAILING PHENOMENON AND RELATED IMAGING PROCESSING CIRCUIT AND DISPLAY APPARATUS

CROSS REFERENCE TO RELATED APPLICATIONS

This application claims the benefit of U.S. Provisional Application No. 62/413,997, filed on Oct. 28, 2016. The entire contents of the related applications are incorporated herein by reference.

BACKGROUND OF THE INVENTION

1. Field of the Invention

The present invention relates generally to display apparatus, and more particularly, to an image processing method, circuit and related display apparatus, which are capable of alleviating tailing phenomenon.

2. Description of the Prior Art

Liquid crystal type display devices, such as LCD or Liquid crystal on silicon (LCoS), display image frames by adjusting the transmissivity of liquid crystal (LC) cells in pixels on the display panel, thereby to change gray levels of pixels.

Dark regions and bright regions in the image frames needs to apply relatively low and high potentials on corresponding LC cells to achieve desired transmissivity. For a small-sized display panel, as pixels are small and close to each other, the LC cells may be reversed at intersections of the dark regions and the bright regions due to interference caused by electric field of adjacent LC cells, which causes affected LC cells to have slow responses while switching to a next state (i.e., presenting a next image frame). At this time, transitions of the LC cells are visible, which is also called tailing phenomenon. Further, if there is a movement in the image frames, such tailing phenomenon is even more visible on the display panel and unfavorable to the user's visual experience.

In view of this, there is a need to provide a solution to alleviate the tailing phenomenon.

SUMMARY OF THE INVENTION

With this in mind, it is one objective of the present invention to alleviate the tailing phenomenon. The present invention provides an image processing technique to reduce potential differences between LC cells at the intersections of dark regions and bright regions, thereby avoiding the LC reverse, and the tailing phenomenon as well.

According to one embodiment, an image processing method is provided, the image processing method comprises detecting one or more edge regions in a plurality of input image frames; detecting movement of the edge region in the input image frames to generate a movement detecting result; and generating a plurality of output image frames by selectively smoothing at least one portion of the edge region at least according to the movement detecting result.

According to one embodiment, an image processing circuit is provided, the image processing method comprises an edge detection circuit and a movement detection circuit and an edge processing circuit. The edge detection circuit is utilized for detecting one or more edge regions in a plurality of input image frames. The movement detection circuit is utilized for detecting movement of the edge region in the input image frames to generate a movement detecting result. The edge processing circuit is utilized for generating a plurality of output image frames by selectively smoothing at least one portion of the edge region at least according to the movement detecting result.

According to one embodiment, a display apparatus is provided, the display apparatus comprises an image processing circuit, a display panel and a driving circuit. The image processing circuit is arranged for detecting one or more edge regions in a plurality of input image frames, detecting movement of the edge region in the input image frames to generate a movement detecting result and generating a plurality of output image frames by selectively smoothing at least one portion of the edge region at least according to the movement detecting result. The display panel is utilized for displaying the output images. The driving circuit is utilized for driving the display panel according to the output image frames.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
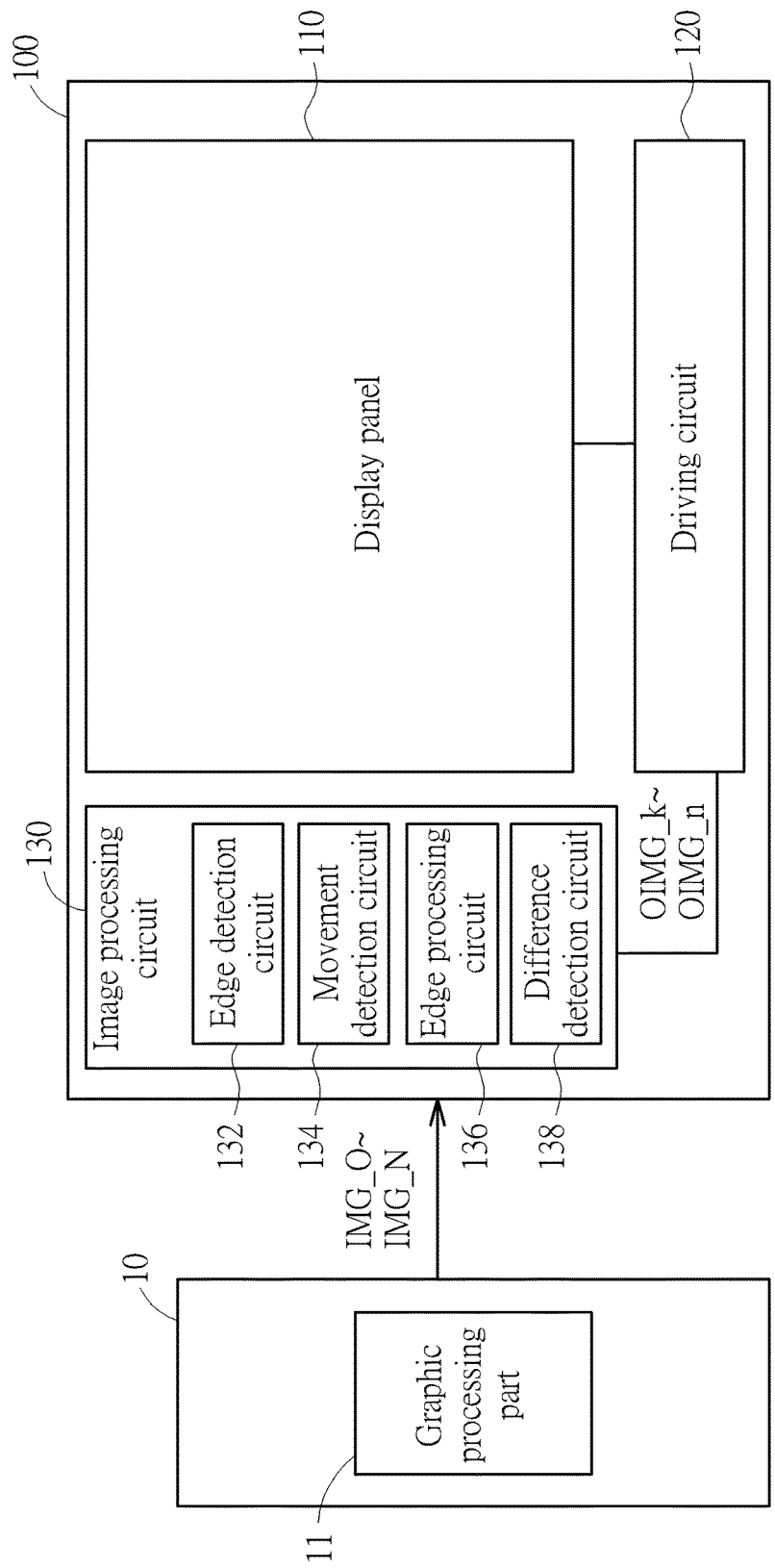
FIG. 1 illustrates a block diagram of a display apparatus and an image processing circuit thereof according to one embodiment of the present invention.

FIG. 1 illustrates a block diagram of a display apparatus and an image processing circuit thereof according to one embodiment of the present invention. The display apparatus 100 includes a display panel 110 (which preferably can be a small-sized LCD panel or an LCoS panel), a driving circuit 120 and an image processing circuit 130. The display apparatus 100 may be connected to a host 10, which could be a PC, a laptop, a portable device, or other electronic device that are capable of providing graphic contents. A graphic processing part 11 in the host 10 provides a plurality of input image frames IMG_0-IMG_n to the display apparatus 100 through a video display interface, which could be HDMI, DVI, or DP.

The image processing circuit 130 is configured to detect one or more edge regions in the input image frames IMG_0-IMG_n. This is because the tailing phenomenon usually occurs at intersection of dark regions and bright regions, which collectively form the one or more edge regions in the input image frames IMG_0-IMG_n. There are various ways to distinguish edges in an image sequence, and thus principles and operations regarding how the image processing circuit 130 detects the edge region are omitted here for sake of brevity. As the tailing phenomenon is mainly caused by the movement of the edge region, after an edge detection circuit 132 of the image processing circuit 130 detects the one or more edge regions in the input image frames IMG_0-IMG_n, a movement detection circuit 134 of the image processing circuit 130 detects movement of the edge region. According to a movement detection result provided by the movement detection circuit 134, an edge processing circuit 136 of the image processing circuit 130 determines whether to smooth at least one portion of the edge region in the input image frames IMG_0-IMG_n, thereby generating a plurality of output image frames OIMG_k-OIMG_n.

In one embodiment, the movement detection circuit 134 of the image processing circuit 130 detects whether the edge region is moving in the input image frames IMG_0-IMG_n. If the edge region is detected moving in the input image frames IMG_0-IMG_n, the edge processing circuit 136 determines to smooth the at least one portion of the edge region; otherwise, the edge region will not be smoothed. Additionally, the movement detection circuit 134 further detects a direction in which the edge region is moving in the input image frames IMG_0-IMG_n. If the edge region is detected moving in a specific direction, the edge processing circuit 136 determines to smooth the at least one portion of the edge region; otherwise, the edge region will not be smoothed. The specific direction is determined according to an arrangement type of pixels on the display panel 110. For example, if the pixels on the display panel 110 are arranged in delta arrangement, the specific direction will be bottom-to-up, left-to-right or lower left-to-upper right. In such case, only when the edge region is detected moving from bottom to top, from left to right, or from lower left to upper right, the edge processing circuit 136 determines to smooth the at least one portion of the edge region.

Figure 2:
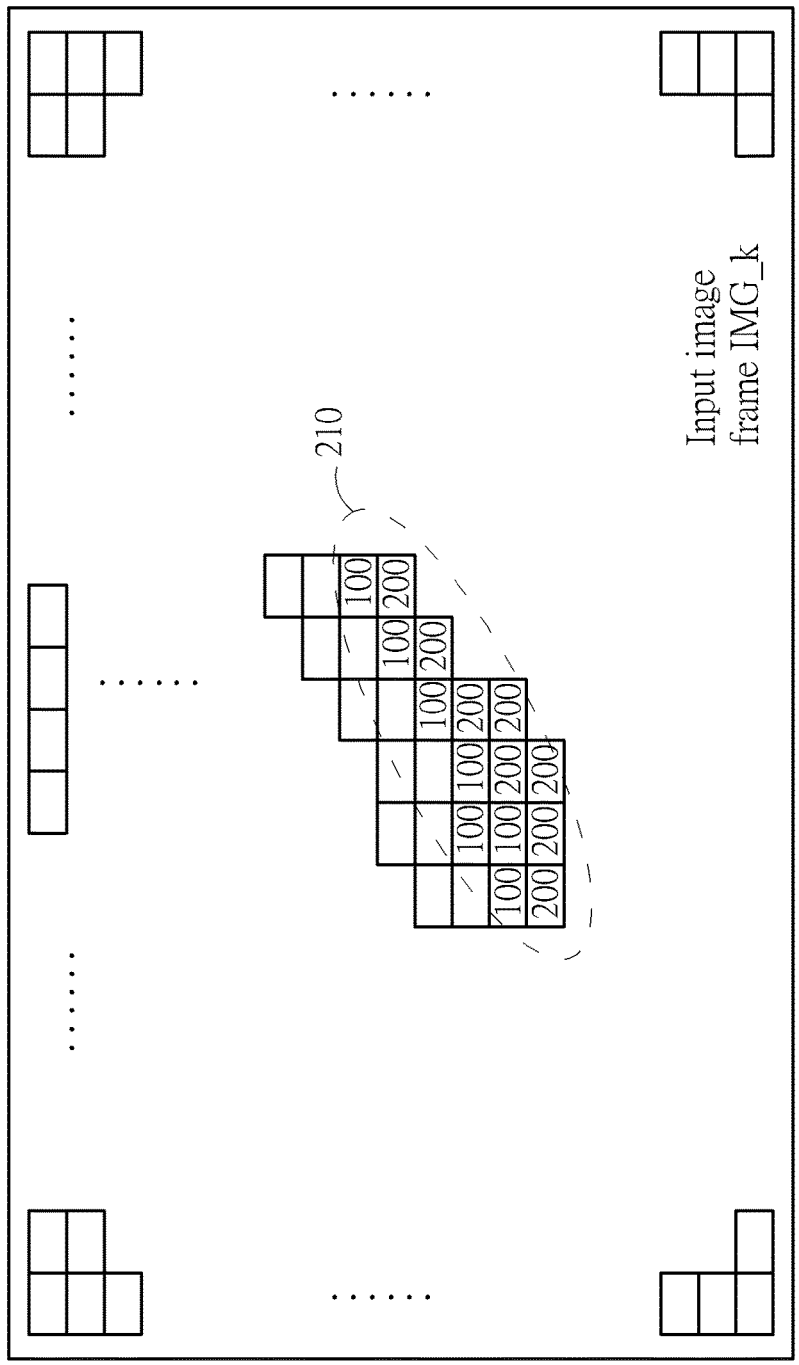
FIG. 2 and FIG. 3 illustrate different distributions of grey levels in an edge region.
Figure 3:
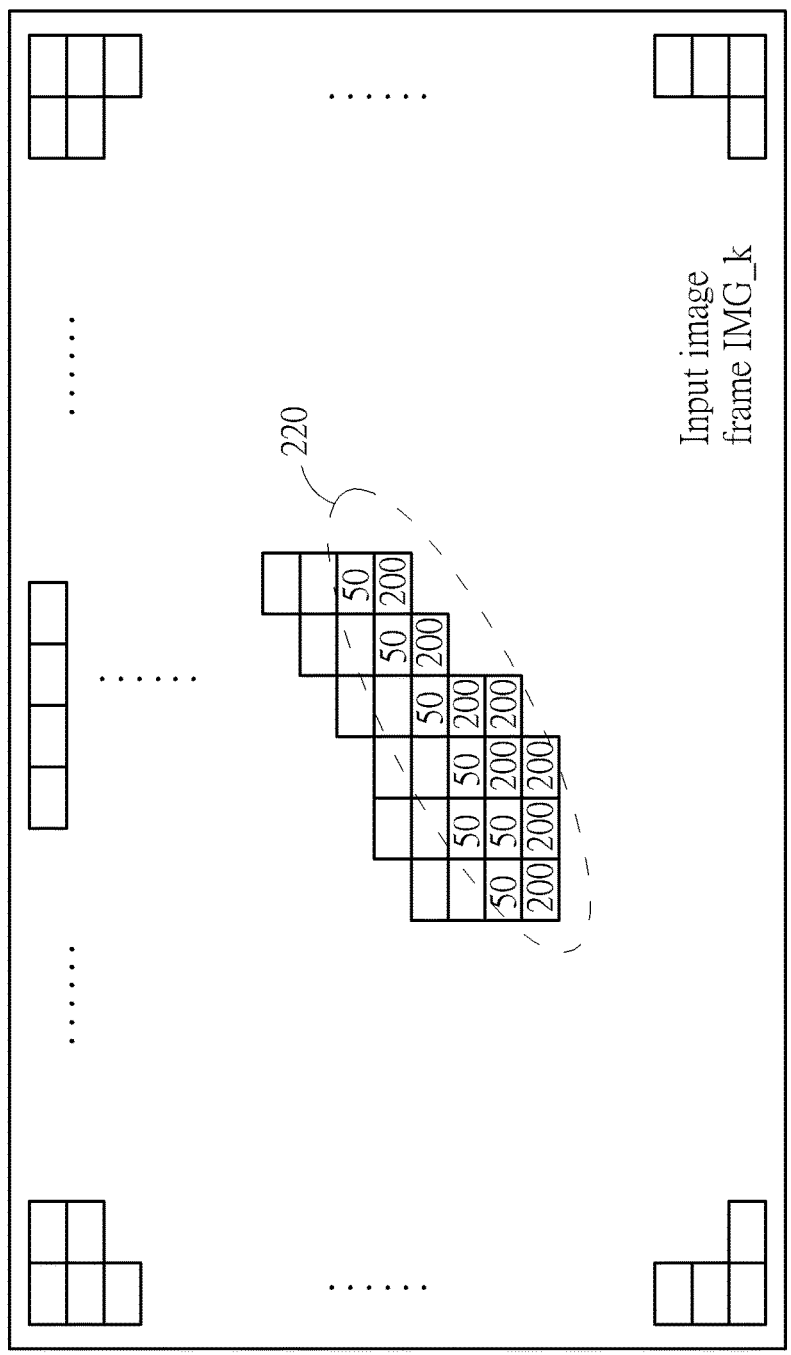

In one embodiment, the image processing circuit 130 further comprises a difference detection circuit 138. The difference detection circuit 138 detects differences of grey levels of pixels in the edge region. If at least one of the detected differences is higher than a threshold, the edge processing circuit 136 determines to smooth the at least one portion of the edge region; otherwise, the edge region will not be smoothed. FIG. 2 and FIG. 3 illustrates distribution of grey levels of pixels in edge regions 210 and 220 (only a portion of grey levels are shown and the entire edge region in the frame is partially identified). In the case of FIG. 2, differences between grey levels of pixels are around 100, the edge processing circuit 136 do not smooth the at least one portion of the edge region 210 since the differences are not high enough. In the case of FIG. 3, differences between grey levels of pixels are around 150, the edge processing circuit 136 determines smooth the at least one portion of the edge region 220 since the differences are high enough.

Figure 4:
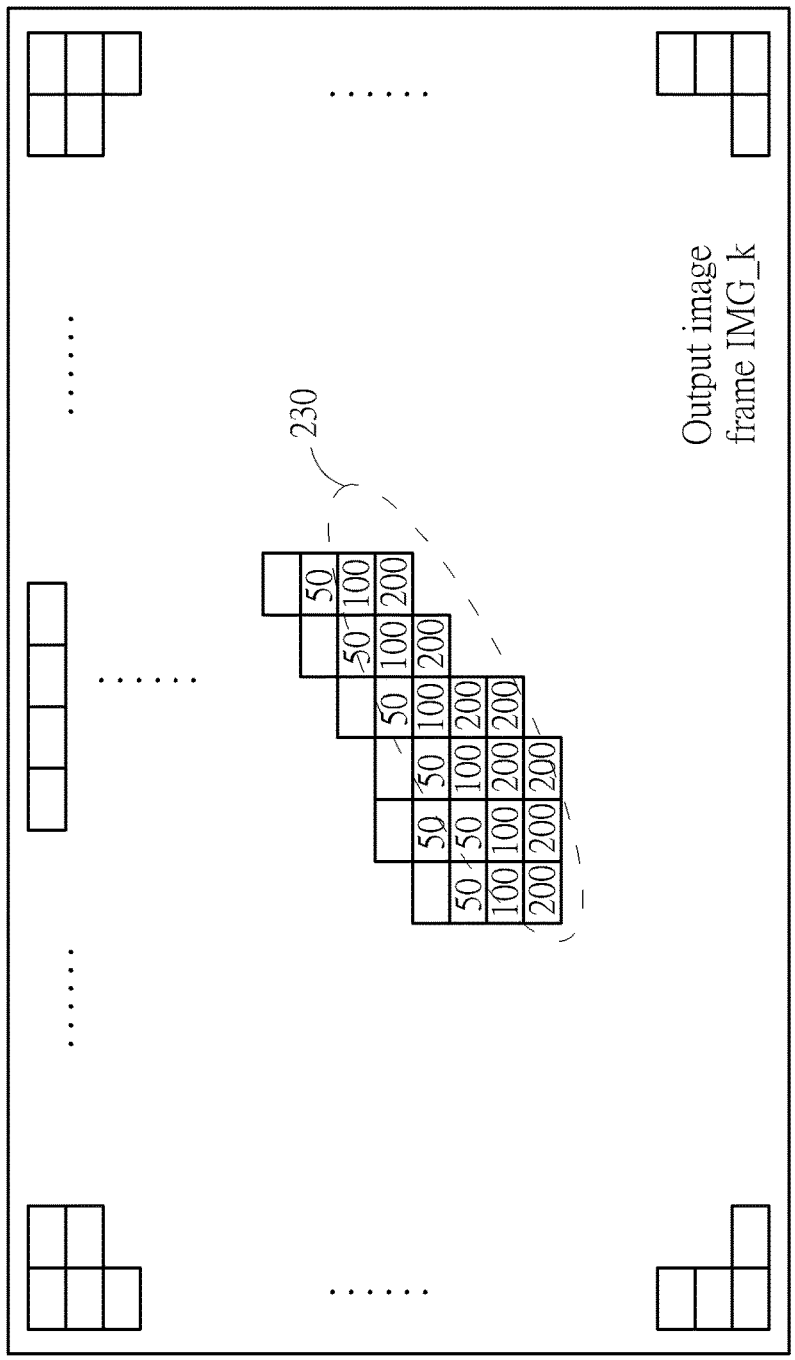
FIG. 4 and FIG. 5 illustrate different distributions of grey levels after smoothing at different intensity levels according to one embodiment of the present invention.

In one embodiment, the edge processing circuit 136 determines smooth the edge region at different intensity levels depending on levels of the tailing phenomenon, which may be determined according to at least one of a speed at which the edge region is moving and differences between grey levels in the edge region. Please refer to FIG. 4 and FIG. 5, which illustrate how to process an edge region in an input image frame at different intensity levels. If the speed at which the edge region is moving is high and/or the differences between the grey levels of pixels in the edge region are high, the edge processing circuit 136 determines to smooth the edge region at a relatively strong intensity level, as the result illustrated by FIG. 4 (only a portion of grey levels are shown), in which the gradient in the grey levels of pixels in the edge region 230 are more smooth.

Figure 5:
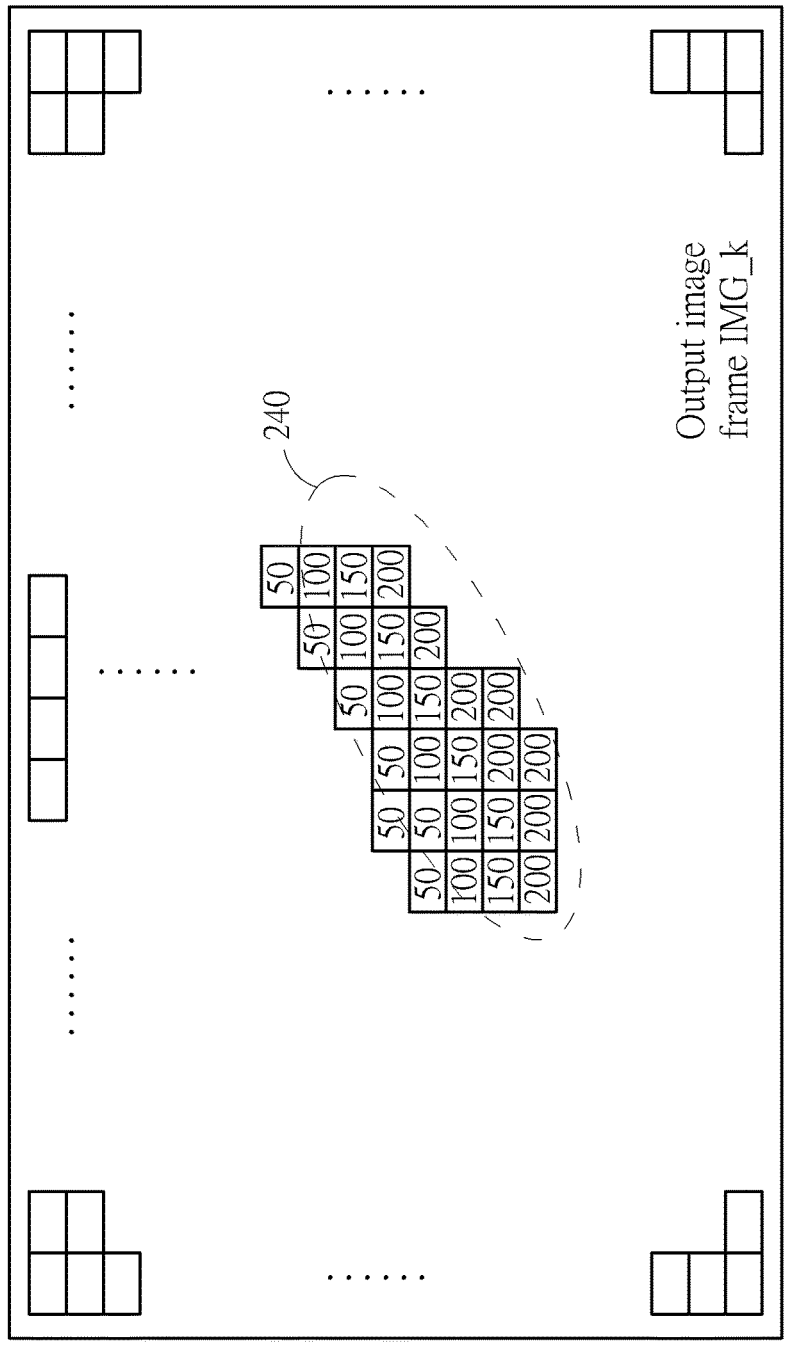

However, if the speed at which the edge region is moving is moderate and/or the differences between the grey levels of pixels in the edge region are moderate (but higher than the predetermined threshold), the edge processing circuit 136 determines to smooth the edge region at a relatively weak intensity level, as the result illustrated by FIG. 5 (only a portion of grey levels are shown), in which the gradient in grey levels of pixels in the edge region 240 are less smooth.

Figure 6:
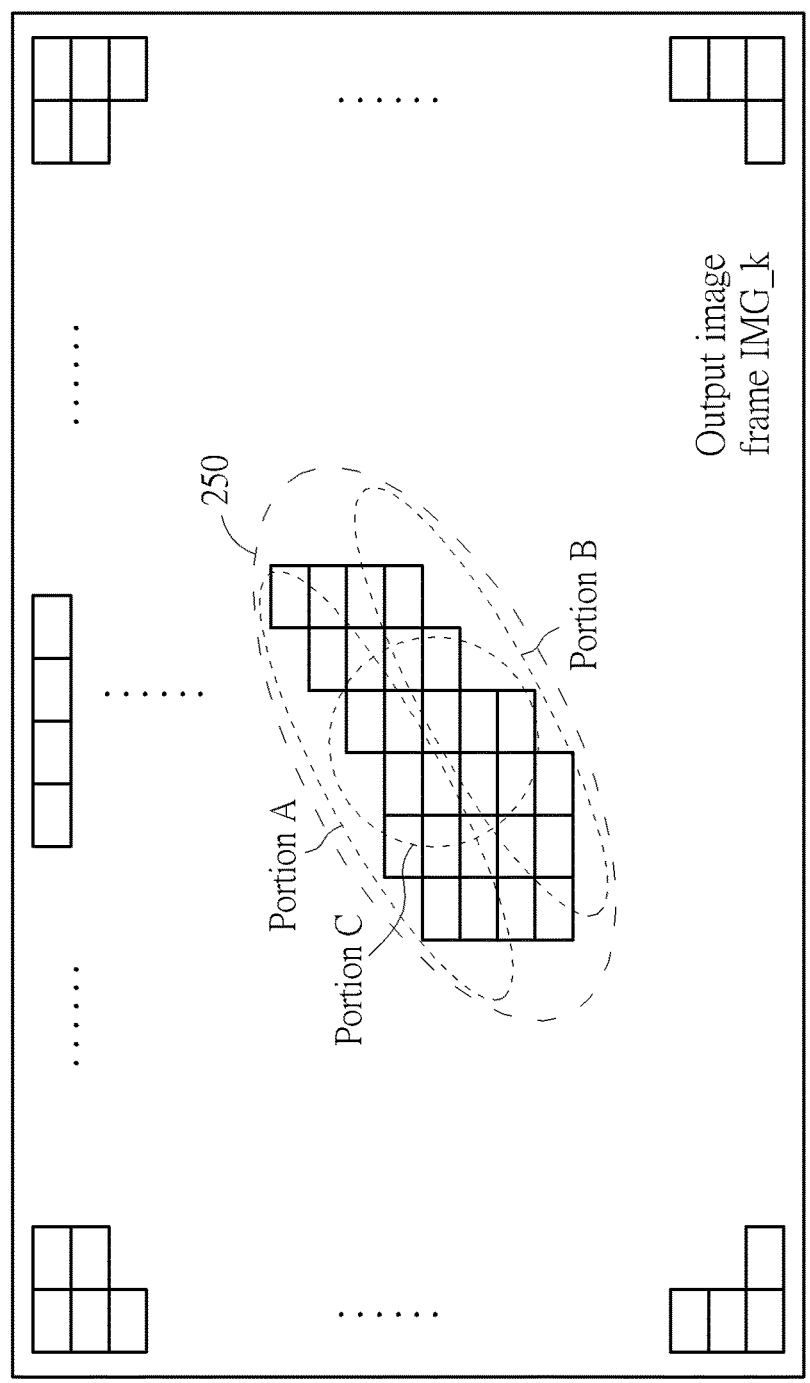
FIG. 6 illustrates selecting different portions of an edge region to smooth according to one embodiment of the present invention.

Depending on levels of the tailing phenomenon, the edge processing circuit 136 also smooth different portions of the edge region according to various embodiments of the present invention. Please refer to FIG. 6, when the edge processing circuit 136 determine to smooth the edge region, the edge processing circuit 136 may select one or multiple ones of portion A, portion B, and portion C to smooth.

The configurability (i.e., portions to be smoothed, and smooth intensity levels) in smoothing the edge region is intended to guarantee the image quality of the output image frames OIMG_k-OIMG_n because smoothing the edge region of the input image frames IMG_0-IMG_n may lead to blurriness in the output image frames OIMG_k-OIMG_n. Hence, the edge processing circuit 136 will dynamically adjusts the smooth intensity levels or portions in the edge region to be smoothed, in order to effectively alleviate the tailing phenomenon without losing too much image quality.

Figure 7:
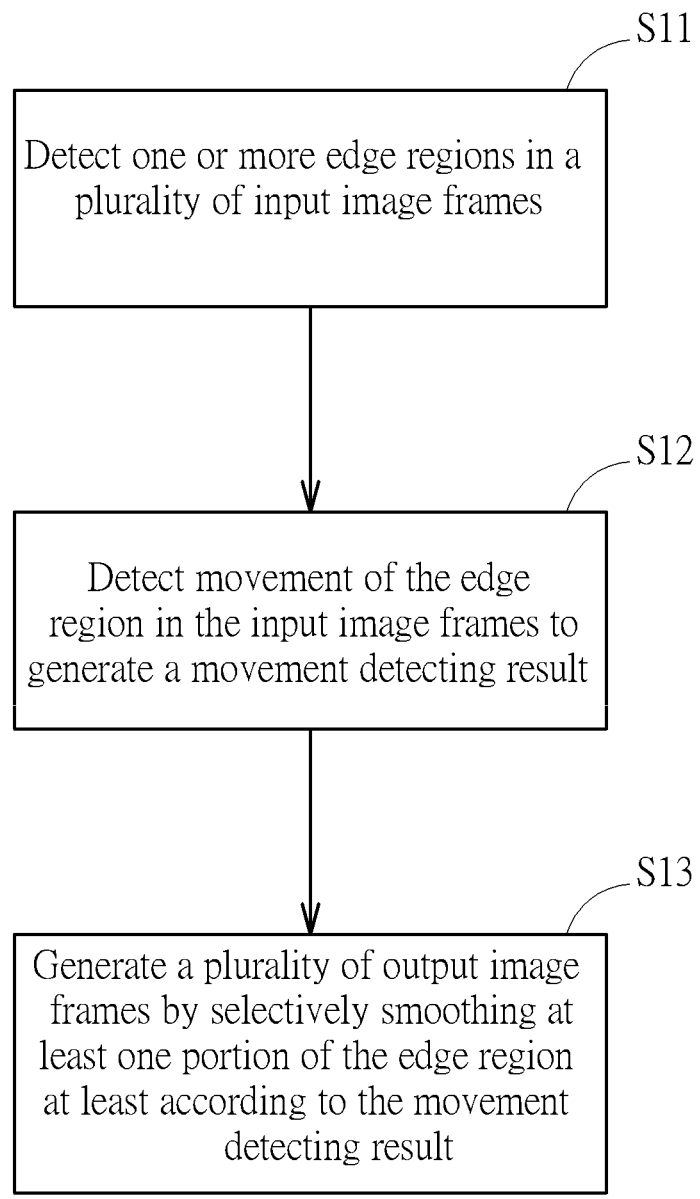
FIG. 7 illustrates a flow chart of an image processing method according to one embodiment of the present invention.

FIG. 7 illustrates a flow chart of an image processing method based on the image processing circuit 130 according to one embodiment of the present invention. As the principles and operations regarding the image processing circuit 130 have been detailed. Further descriptions and explanations regarding the flow and steps S11-S13 thereof are omitted here for sake of brevity.

Reference throughout this specification to "one embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display apparatus, comprising:
   an image processing circuit, for detecting one or more edge regions in a plurality of input image frames, detecting movement of the edge region in the input image frames to generate a movement detecting result and generating a plurality of output image frames by selectively smoothing at least one portion of the edge region at least according to the movement detecting result, thereby to avoid or alleviate tailing phenomenon in displaying image frames;
   a display panel, for displaying the output images; and
   a driving circuit, for driving the display panel according to the output image frames.

2. The display apparatus according to claim 1, wherein the movement detecting result indicates whether the edge region is moving in the input images and the image processing circuit generates the output image frames by smoothing the at least one portion of the edge region when the edge region is detected moving in the input image frames.

3. The display apparatus according to claim 2, wherein the movement detecting result indicates a direction in which the edge region is moving in the input image frames, and the image processing circuit generates the output image frames by smoothing the at least one portion of the edge region when the edge region is detected moving in a specific direction.

4. The display apparatus according to claim 3, wherein the specific direction is determined according to an arrangement type of pixels of the display panel.

5. The display apparatus according to claim 1, wherein the image processing circuit further detects differences of grey levels of pixels in the edge region, and generates the output image frames by smoothing the at least one portion of the edge region when at least one of the detected differences in the edge region is higher than a predetermined threshold.

6. The display apparatus according to claim 1, wherein the image processing circuit smoothes the at least one portion of the edge region at different intensity levels at least according to the movement detection result.

7. The display apparatus according to claim 1, wherein the display panel is a liquid crystal on silicon (LCoS) display panel.

8. An image processing method, comprising:
   detecting one or more edge regions in a plurality of input image frames;
   detecting movement of the edge region in the input image frames to generate a movement detecting result; and
   generating a plurality of output image frames by selectively smoothing at least one portion of the edge region at least according to the movement detecting result, thereby to avoid or alleviate tailing phenomenon in displaying image frames.

9. The image processing method according to claim 8, wherein the step of detecting movement of the edge region comprises detecting whether the edge region is moving in the input image frames; and the step of generating the output image frames comprises:
   generating the output image frames by smoothing the at least one portion of the edge region when the edge region is detected moving in the input image frames.

10. The image processing method according to claim 8, wherein the step of detecting movement of the edge region comprises detecting a direction in which the edge region is moving in the input image frames; and the step of generating the output image frames comprises:
    generating the output image frames by smoothing the at least one portion of the edge region when the edge region is detected moving in a specific direction.

11. The image processing method according to claim 8, further comprising:
    detecting differences of grey levels of pixels in the edge region, and the step of generating the output image frames comprises:
    generating the output image frames by smoothing the at least one portion of the edge region when at least one of the detected differences in the edge region is higher than a predetermined threshold.

12. The display apparatus according to claim 8, wherein and the step of generating the output image frames comprises:
    smoothing the at least one portion of the edge region at different intensity levels at least according to the movement detection result.

13. An image processing circuit, comprising:
    an edge detection circuit, for detecting one or more edge regions in a plurality of input image frames;
    a movement detection circuit, for detecting movement of the edge region in the input image frames to generate a movement detecting result; and
    an edge processing circuit, for generating a plurality of output image frames by selectively smoothing at least one portion of the edge region at least according to the movement detecting result, thereby to avoid or alleviate tailing phenomenon in displaying image frames.

14. The image processing circuit according to claim 13, wherein the movement detection circuit is arranged for detecting whether the edge region is moving in the input images, and the edge processing circuit is arranged for generating the output image frames by smoothing the at least one portion of the edge region when the edge region is detected moving the input image frames.

15. The image processing circuit according to claim 13, wherein the movement detection circuit is arranged for detecting a direction in which the edge region is moving in the input image frames, and the edge processing circuit is arranged for generating the output image frames by smoothing the at least one portion of the edge region when the edge region is detected moving in a specific direction.

16. The image processing circuit according to claim 13, further comprising:
    a difference detection circuit, for detecting differences of grey levels of pixels in the edge region, wherein the edge processing circuit is arranged for generating the output image frames by smoothing the at least one portion of the edge region when at least one of the detected differences in the edge region is higher than a predetermined threshold.

17. The image processing circuit according to claim 13, wherein the edge processing circuit is arranged for generating the output image frames by smoothing the at least one portion of the edge region at different intensity levels at least according to the movement detection result.

* * * * *